June 2, 1964 A. A. REUVERS ETAL 3,135,051
LAY-OUT TOOL
Filed April 17, 1961 2 Sheets-Sheet 1

INVENTORS
ANDREW A. REUVERS
CHARLES BERARI
BY

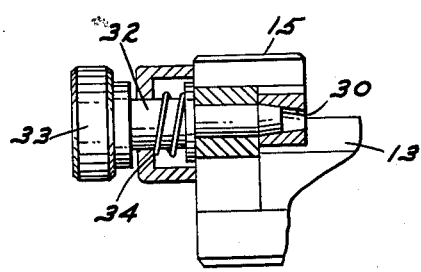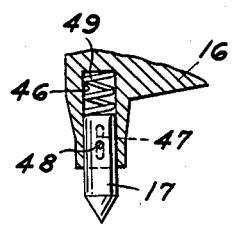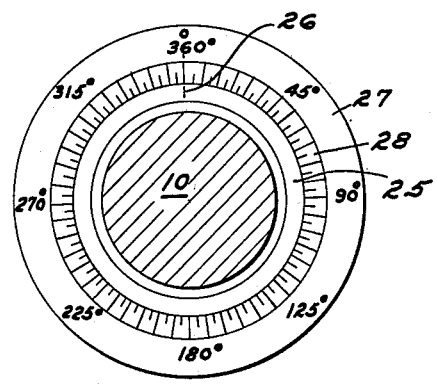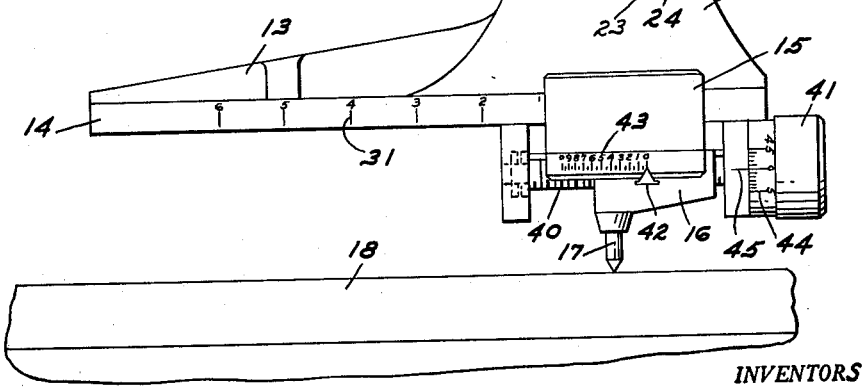

3,135,051
LAY-OUT TOOL
Andrew A. Reuvers, 1367 Cynthia Ave., Madison Heights, Mich., and Charles Berari, 19980 Norwood Ave., Detroit 34, Mich.
Filed Apr. 17, 1961, Ser. No. 114,582
4 Claims. (Cl. 33—26)

This invention relates to a lay-out tool which is easily associable with a machine for working with the machine in combination in laying out scribed lines on a workpiece and obviating the necessity of making other templates or drawings usually employed in lay out work to manually establish the identification of the various points, lines, and arcs.

Lay out means have been employed heretofore to facilitate designating lines, points, etc. on templates and drawings and then transferring same to a workpiece by manual measurement, establishment, and identification, however, the several devices of the prior art have not proven entirely satisfactory inasmuch as they are complicated, time consuming, and expensive to perform, and difficult and inaccurate in practice and moreover require highly skilled labor.

With the foregoing in view, the primary object of the invention is to provide a lay-out tool which is simple in design and construction, inexpensive to manufacture, easy to use, accurate and dependable in use, which obviates the necessity for time consuming manual lay out, establishment, and identification and which requires only average skilled labor.

An object of the invention is to provide a lay-out tool having a shaft insertable and axially fixable in the quill of a machine such as a milling machine.

An object of the invention is to utilize the bi-directionally movable tables on a milling machine for the purpose of establishing various points on a workpiece superposed thereon relative to the axial center of the quill of the machine and the inventive lay-out tool fixed therein.

An object of the invention is to provide an angular measuring circumferential scale and index on the lay-out tool which accurately denotes the annular position of the tool relative to the machine and the workpiece superposed on the tables of the machine.

An object of the invention is to provide an arm on the tool lying on a radius of the machine spindle axis and to provide slide means on the arm.

An object of the invention is to provide a first quick acting slide on the slide means of the arm manually movable there along and a sub-slide on the slide movable by a lead screw, nut, and knob.

An object of the invention is to provide accurate measuring means on the arm relative to the slide and accurate measuring means for smaller lineal increments on the sub-slide relative to the scribing tool itself.

An object of the invention is to mount the scribing tool on the sub-slide so as to be movable with both the slide and the sub-slide.

An object of the invention is to provide accurate measuring scales on the superposed oppositely movable tables of the machine so as to be capable of accurately measuring the position of the workpiece in opposite planes relative to the axis of the lay-out tool as held in the machine spindle.

These and other objects of the invention will become apparent by reference to the following description of a lay-out tool in combination with a machine tool embodying the invention taken in conjunction with the accompanying drawings in which:

FIG. 3 is a side elevational view of the tool seen in FIG. 2 taken in the direction of the arrow 3.

FIG. 4 is an enlarged cross-sectional view of FIG. 3 taken on the line 4—4 thereof.

FIG. 5 is an enlarged detail, partly in cross-section, of the release knob on the slide as seen in the left portion of FIG. 2; and FIG. 6 is an enlarged cross-sectional view of the scribing tool.

Figure 1:
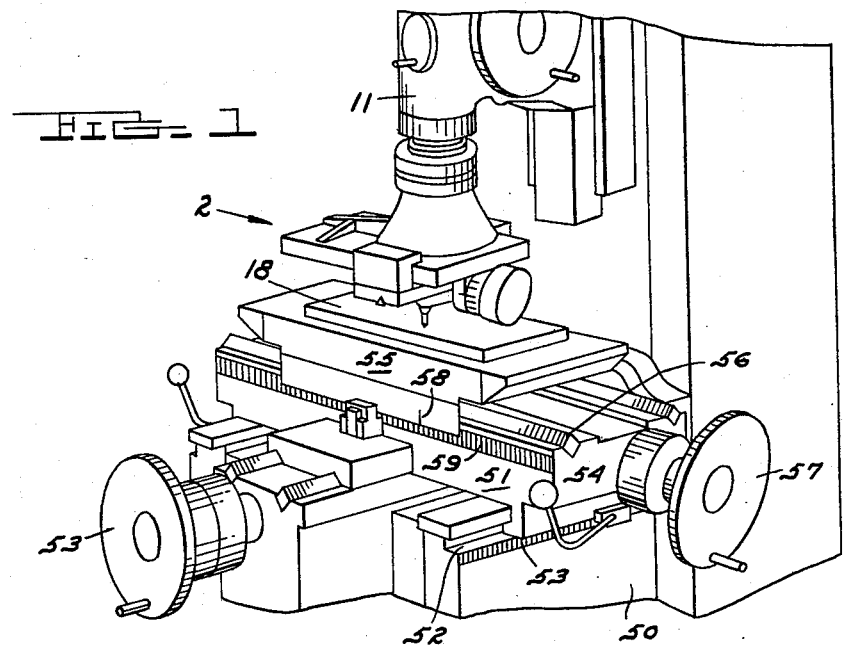
FIG. 1 is a perspective view of the lay-out tool in position on a milling machine.
Figure 2:
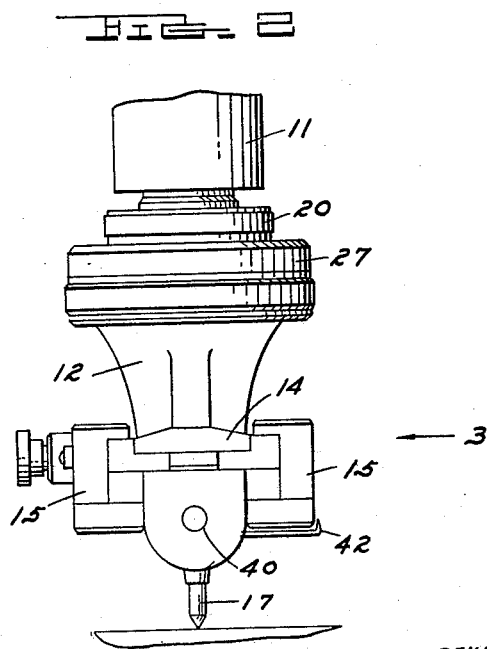
FIG. 2 is an enlarged face elevational view of the tool seen in FIG. 1 taken in the direction of the arrow 2.

Referring now to the drawings wherein like numerals refer to like and corresponding parts throughout the several views, the lay-out tool disclosed therein to illustrate the invention comprises a shaft 10 fixable in the machine spindle 11, a head 12 rotatably mounted on the shaft 10 via bearings, a radial arm 13 on the head 12 having slide ways 14 thereon, a slide 15 slidably disposed on the slide ways 14 of the arm 13, a sub-slide 16 disposed on the slide 15, and a scribing tool 17 carried by the sub-slide 16 for engaging the workpiece 18.

More particularly, the shaft 10 carries a locking collar 20 which frictionally engages the plate 21 fixed on the head 12 via the spring pressed pins 22 so that by turning the collar 20 on the threads to move the collar upwardly, the pressure on the pins 22 is mechanically released relative to the collar allowing the head 12 to be pivoted on the shaft 10 via the bearings 23 while the spring 24 urges the pins into frictional engagement with the head plate 23 to prevent free pivotal movement but so as to permit easy manual movement and to maintain the relative angular position of the head upon manual release.

Upon swinging the head 12 to the desired angular position, the locking collar 20 is screwed down against the pins 22 which engage the head plate 23 mechanically holding the head 12 in the adjusted angular position. The annular index ring 25 is secured to the shaft 10 and carries index marking 26 while the annular collar 27 carries the angular incremental 0–360 degree markings to measure the angular position of the head 12 and arm 13 relative to the axis of the shaft 10 and the machine spindle 11.

Thus by loosening the nut 20, the arm 13 can be swung relative to the shaft 10 and its angular position accurately read via the index 26 and the marked scale 28 to accurately locate the center of the arm 13 on any desired radius of the shaft 10 and scribing tool 17 center.

The slide 15 is equipped with apertures 30 at the scale markings 31 for receiving the spring-pressed pin 32, and the pin 32 is withdrawable from the apertures 30 via pulling the knob 33 outwardly against the spring 34 whereby the slide 15 is released relative to the arm 13 so as to be manually movable therealong.

The apertures 30 being located opposite the scale markings 31 provide ready and accurate measuring means for the position of the slide 15 along the arm 13 and the sub-slide 16 is carried on the lead screw 40 via internal threads so that by turning the micrometer knob 41 the sub-slide 16 is movable relative to the slide 15 and the index 42 on the sub-slide is readable relative to the scale 43 on the slide so that accurate less than inch markings on the scale 31 are readily obtainable by turning the micrometer knob 41 which is provided with a scale 44 for sub-increments readable relative to the index 45 for determining measurements between the scale markings 43.

The scribing tool 17 is located in a socket 46 in the sub-slide 16 and is equipped with a slot 47 carrying the pin 48 so that pressure of the spring 49 urges the scribing tool 17 outwardly with the pin 48 holding the scribe 17 relative to the socket 46 by bearing against the pin 48.

Obviously, upon lowering the tool via depressing the spindle 11 of the machine, the scribing tool 17 resiliently presses against the workpiece 18 and is thereby capable of variably adjusting the spring-pressed contact.

The machine 50 is provided with a base table 51 slidably movable in the ways 52 via the hand wheel 53 attached lead screw and the table 51 carries the index 54 readable on the scale 53 on the machine so that the in and out distance of the table 51 is readily readable via the index 54 on the scale 53 relative to the axis of the machine spindle 11 and the center axis of the lay-out tool scribe 17.

The top table 55 is slidably disposed on the base table 51 via the ways of slides 56 and is movable relative thereto via the hand wheel 57 attached lead screw and the top table 55 carries the index 58 readable relative to the scale 59 carried by the base table 51 so that the crosswise movement of the top table 55 and a workpiece 18 disposed thereon is readily readable as to cross wise position relative to the axis of the spindle 11 and the scribing tool 17.

In operation, the user establishes the center point for work purposes on the workpiece 18 and places the workpiece 18 on the top table 55 and establishes the tables 51 and 55 at center positions or at known positions and then establishes the workpiece 18 working center point relative to the scribing tool 17 when located at zero or at a known position relative to the scales 31, 43, and 44. This establishes the working center point of the workpiece 18 relative to the tables 51 and 55 relative to in and out movement and back and forth movement so that any other point on the workpiece can readily be established by turning the hand wheels 53 and 57 and reading the scales 53 and 59 relative to their indexes.

In the event that a radius is desired to be scribed on the workpiece 18 from the center point as established, the operator loosens the lock ring 20 and swings the arm 13 and reads the scale 28 relative to the index 26 and upon establishing the angular position of the arm 13 on the desired radius the operator then tightens the lock ring 20 fixing the arm 13 on a desired radius.

Should the radius length be five and one half and four thousandths inches the operator pulls the knob 33 outwardly and moves the scribe 17 from the position shown in FIG. 3 by sliding the slide 15 relative to the arm 13 and then allows the pin 32 to seat in the aperture opposite the scale mark at the five inch point.

He then turns the micrometer knob 41 moving the index 42 to the five mark on the scale 43 and then continues to turn the knob 41 until the scale 44 reads four thousandths relative to the index 45.

At this point the operator has established a new known point on the workpiece and can work from this point or he can return to the working center point and move outwardly therefrom via the accurate scales on the tables and the accurate scales on the arm together with the accurate angular scale on the head and shaft.

In scribing an arc or a circle the user establishes the center thereof as previously described and then loosens the lock ring 20 and having previously established the scribing tool 17 at the desired radius as previously described, he swings the arm 14 so that the scribing tool 17 moves on a radial or circumferential arc any number of degrees and this can be readily read on the scale 28 relative to the index 26.

Thus it can be seen with a simple scribing tool as previously described that the operator, without any other scales or measuring devices, can accurately scribe the desired lines on a workpiece by reading the dimensions off a drawing without the use of the usual angular and lineal measuring instruments and without the use of scribing compasses, etc.

Since the tool accurately centers itself at all times and since the scales read accurately all the time, the point on the workpiece can be easily accurately established by reading the various scales, there is no room for user inaccuracies relative to manually held, positioned, located scales, angular measuring instruments, compasses, etc.

The inventive scribing tool with the features described constitutes a compact, durable, neat appearing mechanism easily mounted on a machine such as a milling machine and is easily operated by even ordinary labor and is capable of rapidly and accurately creating a scribed workpiece as though highly skilled labor and many hours of laborious time and expense were consumed in the layout.

Although but a single embodiment of the invention has been shown and described in detail, it is obvious that many changes may be made in the size, shape, detail, and arrangement of the various elements of the invention within the scope of the appended claims.

We claim:

1. A lay-out tool and machine combination for quickly and accurately scribing lines in a plane such as on a workpiece or drawing paper; said machine comprising a table bi-directionally movable in a first plane, a second table bi-directionally movable in a second plane transverse to said first plane, one said table being superposed on the other said table and being adapted to support a workpiece; said tables both having accurate lineal measuring means and visual scales indicating their relative positions, a spindle disposed over said tables having an axis normal to said tables; said spindle having raising and lowering means; said lay-out tool comprising a shaft disposed in said spindle, a rotatable head on said shaft, accurate angular measuring means on said head and shaft visually indicating their relative angular position; means for locking said head on said shaft at any angular position, a slide arm on said head lying on a radius to said heads axis of rotation, a slide on said arm, a sub-slide on said slide, a scribe on said sub-slide for engaging a workpiece; said slide and sub-slide having accurate lineal measuring means visually indicating the position of said scribe along said arm; both said machine table measuring and indicating means and said lay-out tool slide measuring and indicating means using said spindle axis as a base reference zero point; said tables being adapted to locate any point on a workpiece thereon relative to said spindle axis; said head slide arm being adapted to swing around said spindle axis above said workpiece; said slides being adapted to move on a radius from said spindle axis; said scribe being adapted thereby to move along a radius or swing on a radius relative to any point on a workpiece with the point being easily established relative to said spindle axis via adjusted and measured compound movement of said tables, with the radius extent being easily established by reading said measuring and indicator means on said slides and arm, and with the angular position of the radius being accurately positioned and readable by reading said angular measuring scales on said shaft and head.

2. A lay-out tool for quickly and accurately scribing lines in a plane such as on a workpiece or drawing paper particularly suitable for use on a machine with a table bi-directionally movable in a first plane, a second table bi-directionally movable in a second plane transverse to said first plane with one table superposed on the other table and being adapted to support a workpiece; the tables both having accurate lineal measuring means and visual scales indicating their relative position; a spindle including raising and lowering means disposed over the tables having an axis normal to the tables; said lay-out tool comprising a shaft disposed in a machine spindle, a rotatable head on said shaft, accurate angular measuring means on said head and shaft visually indicting their relative angular position; means for locking said head on said shaft at any angular position, a slide arm on said head lying on a radius to said heads axis of rotation, a slide on said arm, a sub-slide on said slide, a scribe on said sub-slide for engaging a workpiece; said slide and sub-slide having accurate lineal measuring means visually indicating the position of said scribe along said arm; said lay-out tool slide measuring and indicating means using said spindle axis as a base reference zero point; said lay-out tool being adapted to cooperate with any point on a workpiece relative to the machine spindle axis as positioned by the machine tables; said head slide arm being adapted to swing around the machine spindle axis above a workpiece; said slides being adapted to move on a radius from said axis; said scribe being adapted thereby to move along a radius or swing on a radius relative to any point on a workpiece with the point being easily established relative to said axis via adjusted and measured compound movement of the machine tables with the radius extent being easily established by reading said measuring and indicator means on said slides and arm, and with the angular position of the radius being accurately positioned and readable by reading said angular measuring scales on said shaft and head.

3. In combination, a machine and a lay-out tool; said machine having a vertical spindle on an axis, a four-way movably adjustable table below said spindle, and accurate visual measuring means on said table indicating the location of the table relative to said spindle axis; said table being adapted to support a workpiece and to locate any point on said workpiece relative to said spindle axis by its four-way movable adjustment and visually indicating measuring means; said lay-out tool having a shaft insertable in said machine spindle, a head rotatably supported on said shaft, visually readable angular measuring means on said shaft and head showing the angular position of said head relative to said shaft, a slide arm on said head lying on a radius thereof, a slide lineally movably disposed on said slide arm, a sub-slide on said slide, a scribe on said sub-slide, and accurate visual lineal measuring means on said slides and arm indicating the position of said scribe relative to said spindle axis from zero outwardly; a point on a workpiece being movable relative to a point below said spindle axis by adjustably moving said table and reading said movement by said table measuring means; said scribe at zero relative to said spindle axis being capable of marking said point on a workpiece by depressing said spindle; said scribe being capable of marking a radius on a workpiece relative to said point by outward movement of said slide on said arm; said scribe being capable of marking a radial arc relative to said point by swinging said head on said shaft; said arm lineal measuring means visually indicating the length of the radial marking; said head and shaft angular measuring means indicating the angular extent of a radial arc; and said arm and slide lineal measuring means indicating the radius of the angular arc.

4. A lay-out tool usable with a machine having a vertical spindle on an axis, a four-way movably adjustable table below the spindle, and accurate two-plane visual measuring means on the table indicating the location of the table relative to the spindle axis with table being adapted to support a workpiece and to locate any point on the workpiece relative to the spindle axis by its four-way movable adjustment and visually indicating measuring means; said lay-out tool having a shaft insertable in the machine spindle, a head rotatably supported on said shaft, visually readable angular measuring means on said shaft and head showing the angular position of said head relative to said shaft, a slide arm on said head lying on a radius thereof, a slide lineally movably disposed on said slide arm, a sub-slide on said slide, a scribe on said sub-slide, and accurate visual lineal measuring means on said slides and arm indicating the position of said scribe relative to said spindle axis from zero outwardly; a point on a workpiece being movable relative to a point below said head axis by adjustably moving the table and reading the movement by the table measuring means; said scribe at zero relative to said head axis being capable of marking a point on a workpiece by depressing said spindle; said scribe being capable of marking a radius on a workpiece relative to said point by outward movement of said slide on said arm; said scribe being capable of marking a radial arc relative to said point by swinging said head on said shaft; said arm lineal measuring means visually indicating the length of the radial marking; said head and shaft angular measuring means indicating the angular extent of a radial arc; and said arm and slide lineal measuring means indicating the radial extent of the arc.

References Cited in the file of this patent

UNITED STATES PATENTS

| | | |
|---|---|---|
| 773,896 | Richards | Nov. 1, 1904 |
| 1,379,253 | Dorney | May 24, 1921 |
| 1,629,143 | Bungart | May 17, 1927 |
| 2,744,329 | Way et al. | May 8, 1956 |
| 2,978,814 | Burhans | Apr. 11, 1961 |
| 3,002,281 | Stennes | Oct. 3, 1961 |

FOREIGN PATENTS

| | | |
|---|---|---|
| 443,642 | Germany | May 3, 1927 |